United States Patent
Stockner et al.

[11] Patent Number: 5,901,686
[45] Date of Patent: May 11, 1999

[54] FLUID SEAL FOR CYCLIC HIGH PRESSURES WITHIN A FUEL INJECTOR

[75] Inventors: Alan R. Stockner, Metamora; Jay E. Tomaseski, Bloomington; Norval J. Wiemken, Dwight, all of Ill.

[73] Assignee: Caterpillar Inc., Peoria, Ill.

[21] Appl. No.: 08/963,315

[22] Filed: Nov. 3, 1997

Related U.S. Application Data

[63] Continuation of application No. 08/652,174, May 23, 1996, Pat. No. 5,682,861.

[51] Int. Cl.$^6$ .................................................. F02M 37/04
[52] U.S. Cl. ......................... 123/495; 123/506; 92/168
[58] Field of Search ..................... 123/495, 506, 123/446, 496, 508, 299, 300; 277/103; 417/540, 541, 423.11, 284; 92/168; 239/88–95

[56] References Cited

U.S. PATENT DOCUMENTS

| | | |
|---|---|---|
| 1,860,862 | 2/1932 | Le Pul . |
| 2,323,438 | 8/1943 | Ernst .......................................... 92/168 |
| 2,676,061 | 4/1954 | Arisman ................................. 299/107.2 |
| 3,053,463 | 9/1962 | Milleville .................................. 239/584 |
| 3,507,584 | 4/1970 | Robbins ...................................... 92/168 |
| 4,082,072 | 4/1978 | Johnson ..................................... 123/495 |
| 4,141,675 | 2/1979 | O'Neill ...................................... 123/495 |
| 4,235,265 | 11/1980 | Felirs .......................................... 92/168 |
| 4,448,574 | 5/1984 | Shimizu ..................................... 417/541 |
| 5,067,880 | 11/1991 | Finsterwalder ........................... 123/506 |
| 5,259,351 | 11/1993 | Rossingnol ............................... 123/506 |
| 5,402,764 | 4/1995 | Rossingnol ............................... 123/508 |
| 5,492,098 | 2/1996 | Hafner ...................................... 123/506 |
| 5,601,345 | 2/1997 | Tackett ..................................... 277/103 |

FOREIGN PATENT DOCUMENTS

| | | |
|---|---|---|
| 862981 | 3/1941 | France . |
| 2339066 | 8/1977 | France ............................ F02M 51/00 |
| 33 38741 | 4/1984 | Germany .......................... F02D 5/02 |
| 43 06 073 | 1/1994 | Germany ......................... F04B 13/00 |
| 1482450 | 8/1977 | United Kingdom ............... F16J 9/00 |
| 1574128 | 9/1980 | United Kingdom ........... F02M 57/02 |

*Primary Examiner*—Carl S. Miller
*Attorney, Agent, or Firm*—Liell & McNeil

[57] ABSTRACT

A cyclic high pressure fluid seal for a fuel injector includes an injector body that defines a cyclic high pressure space connected to a low pressure space by a bore. A member with a pressure face end and a side surface is mounted to reciprocate in the bore between a retracted position and an advanced position. An O-ring is positioned in contact with the side surface of the member and the injector body within the bore. A portion of the member and the bore define a pressure accumulation volume positioned between the O-ring and the pressure face end. The pressure accumulation volume is positioned such that fluid pressure in the pressure accumulation volume changes with that of the cyclic high pressure space.

14 Claims, 2 Drawing Sheets

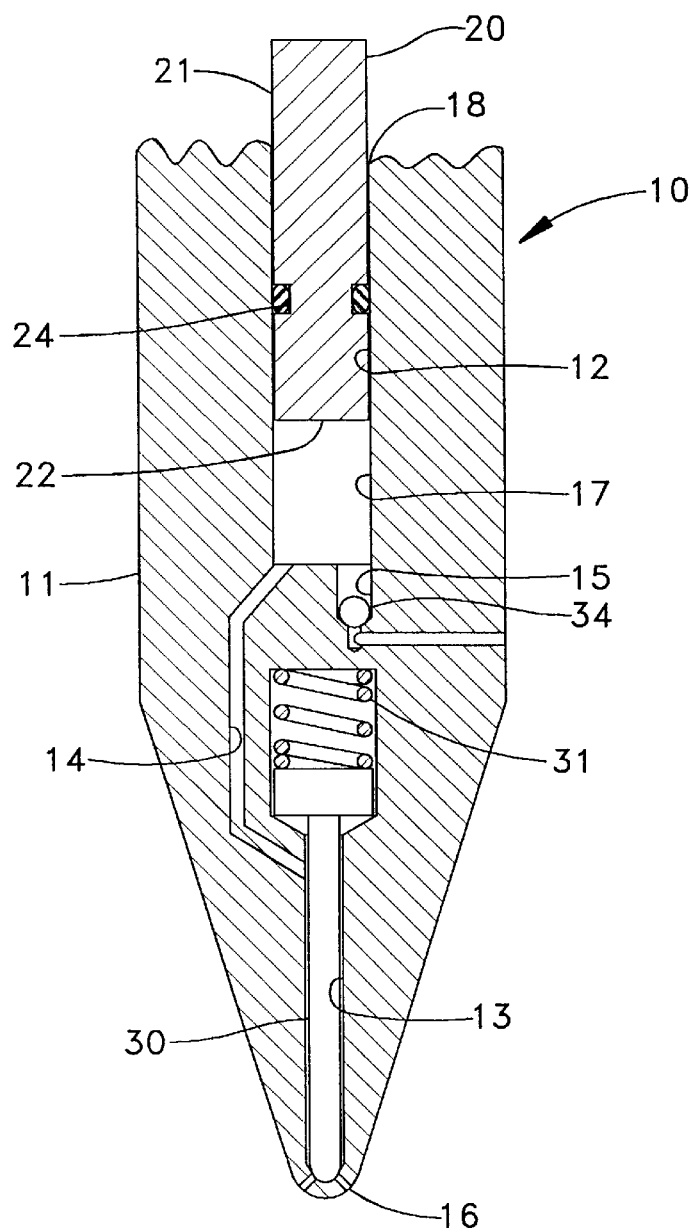
Fig_1_
(PRIOR ART)
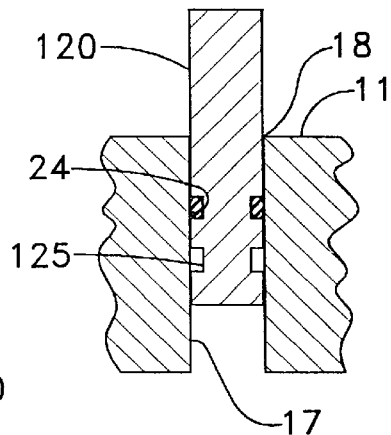
Fig_2_
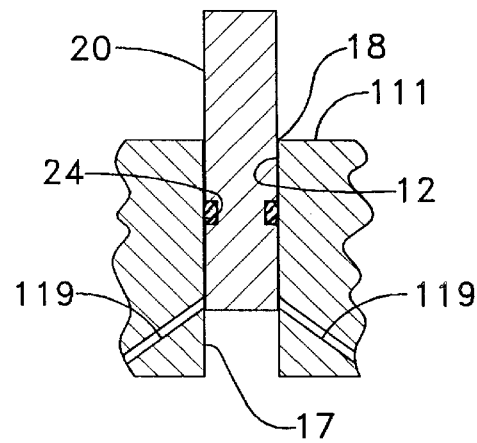
Fig_3_
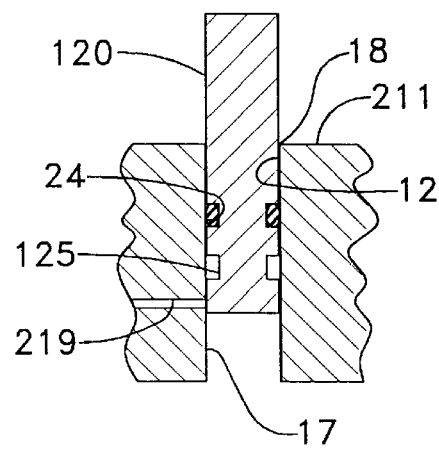
Fig_4_

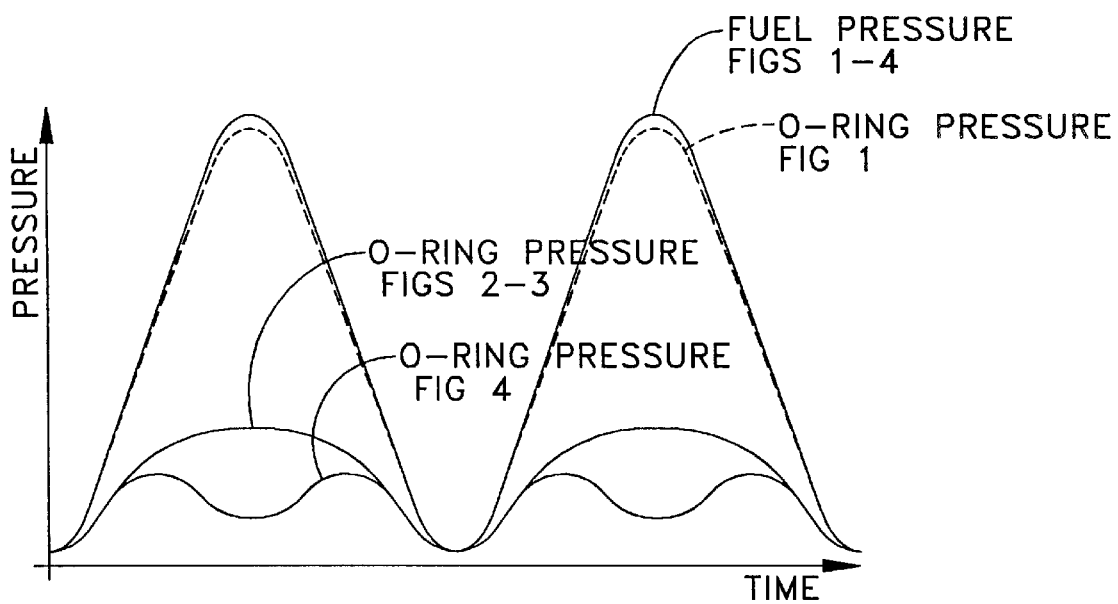
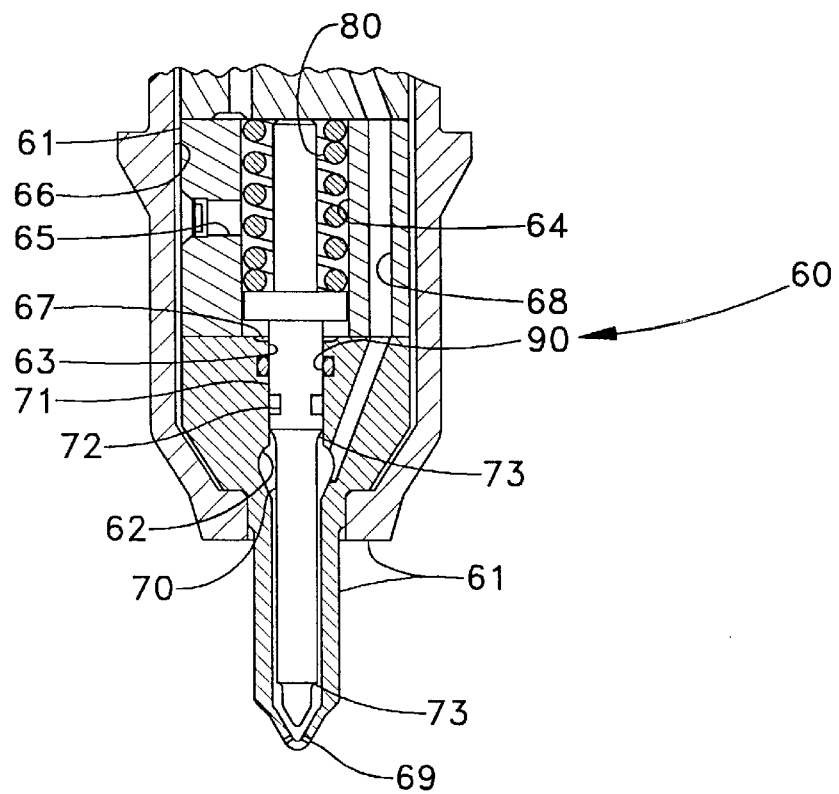

FLUID SEAL FOR CYCLIC HIGH PRESSURES WITHIN A FUEL INJECTOR

RELATION TO OTHER PATENT APPLICATION

This application is a continuation of patent application Ser. No. 08/652,174, filed May 23, 1996, now U.S. Pat. No. 5,682,861 with the same title.

TECHNICAL FIELD

The present invention relates generally to fluid seals for fuel injectors, and more particularly to a sealing strategy to prevent leakage past a reciprocating cylindrical member, such as a plunger or needle check, that sees a relatively high pressure over a portion of each injection cycle.

BACKGROUND ART

In one class of fuel injectors, a reciprocating plunger is utilized to pressurize fuel to initiate and sustain injection. With each reciprocation, pressure gradients along the plunger can oscillate between zero and about 20,000 psi or more at a frequency of many times per second. Because of this high cyclic pressure gradient, fuel naturally has the tendency to leak past the plunger along the plunger bore wall. For a number of reasons, including decreased complexity, increased reliability, allowable fuel leakage, concerns about where and how to route the leaked fuel and for other reasons known to those skilled in the art, it is often desirable to eliminate leakage past the plunger by using an O-ring seal. However, because of the high frequencies involved in injection cycles and the extreme magnitude of cyclic pressure changes acting on an O-ring seal, most presently available O-rings tend to fail long before the other components of the fuel injector. In other words, O-ring technology has not sufficiently advanced to provide reliable and long term sealing at the high frequencies and relatively extreme pressures experienced within a fuel injector environment.

The present invention is directed to overcoming this and other problems associated with sealing against fluid leakage past a reciprocating cylindrical member within a fuel injector.

DISCLOSURE OF THE INVENTION

A fuel injector includes an injector body with a plunger bore that opens to a nozzle outlet. A plunger with a pressure face end and a side surface is positioned to reciprocate in the plunger bore between an advanced position and a retracted position. A portion of the plunger bore and the plunger define a fuel pressurization chamber that opens to the nozzle outlet. A needle valve member is positioned in the injector body adjacent the nozzle outlet, and is movable between an open position in which said nozzle outlet is open and a closed position in which said nozzle outlet is closed to the fuel pressurization chamber. An O-ring is positioned in contact with the side surface of the plunger and the plunger bore of the injector body. A portion of the plunger and the plunger bore define a pressure accumulation volume positioned between the O-ring and the pressure face end. The pressure accumulation volume is positioned such that fluid pressure in the pressure accumulation volume changes with that of the fuel pressurization chamber.

In another embodiment, a cyclic high pressure fluid seal for a fuel injector includes an injector body that defines a cyclic high pressure space connected to a low pressure space by a bore. A member with a pressure face end and a side surface is mounted to reciprocate in the bore between a retracted position and an advanced position. An O-ring is positioned in contact with the side surface of the member and the injector body within the bore. A portion of the member and the bore define a pressure accumulation volume positioned between the O-ring and the pressure face end. The pressure accumulation volume is positioned such that fluid pressure in the pressure accumulation volume changes with that of the cyclic high pressure space.

BRIEF DESCRIPTION OF THE DRAWINGS

FIG. 1 is a partial sectioned side elevational view of a fuel injector according to the prior art.

FIG. 2 is a partial sectioned side elevational view of a portion of a fuel injector according to one embodiment of the present invention.

FIG. 3 is a partial sectioned side elevational view of a portion of a fuel injector according to another embodiment of the present invention.

FIG. 4 is a partial sectioned side elevational view of a portion of a fuel injector according to still another embodiment of the present invention.

FIG. 5 is a graph of pressure versus time for two injection cycles at certain locations within the injectors of FIGS. 1–4.

FIG. 6 is a partial sectioned side elevational view of a fuel injector according to another embodiment of the present invention.

BEST MODE FOR CARRYING OUT THE INVENTION

Referring now to FIG. 1, a prior art fuel injector 10 of the type that utilizes a plunger to pressure fuel is illustrated for the purposes of explaining the problems solved by the present invention. Injector 10 includes an injector body 11 that defines a plunger bore 12 that opens to a nozzle outlet 16 via a nozzle supply passage 14 and a nozzle chamber 13. A plunger 20 having a pressure face end 22 and a side surface 21 is positioned to reciprocate within plunger bore 12 between an advanced position and a retracted position, as shown. A portion of plunger bore 12 and plunger 20 define a fuel pressurization chamber 17 that opens to nozzle supply bore 14. A fuel supply passage 15 re-supplies fuel to fuel pressurization chamber 17 when plunger 20 is retracting toward its retracted position. A check valve 34 prevents the back flow of fuel from fuel pressurization chamber 17 into fuel supply passage 15 when plunger 20 is undergoing its downward stroke.

A needle check valve 30 is mounted within the nozzle chamber 13 of injector body 11. Needle valve 30 is capable of moving to an open position in which nozzle chamber 13, and hence fuel pressurization chamber 17, are open to nozzle outlet 16. Needle check valve 30 is normally biased via compression spring 31 to a closed position, as shown, in which nozzle chamber 13 is closed to nozzle outlet 16. When plunger 20 begins its downward stroke, pressure within fuel pressurization chamber 17 quickly rises. This fuel pressure in turn acts upon hydraulic lift surfaces of needle check 30 causing it to lift open against the action of compression spring 31. Each injection event ends when fuel pressure within fuel pressurization chamber 17 drops below that necessary to hold needle check 30 open. Those skilled in the art will appreciate that this end of injection event can be caused by a number of factors including ceasing the downward movement of plunger 20, providing a spill port, or some other suitable means for ending each injection event.

Those skilled in the art will also appreciate that other known types of needle check valves other than the valve opening pressure type illustrated could be utilized in a fuel injector according to the present invention.

FIG. 5 shows the pressure trace within fuel pressurization chamber 17 for two reciprocation cycles (i.e. two injection cycles of the injector) of plunger 20. The peak pressure can be in excess of 20,000 psi. In order to prevent leakage in the annular area 18 that exists between side surface 21 of plunger 20 and the wall of plunger bore 12, an O-ring 24 is included within an annular indentation machined into plunger 20. O-ring 24 acts as the seal against fuel pushed along plunger 20 during the extreme pressures of injection. While there are available O-rings that can provide an adequate seal at these extreme pressures, none have shown themselves sufficiently robust to perform satisfactorily over the millions of rapid cycles that are undergone in the life of a typical fuel injector of this type.

Referring now in addition to FIGS. 2–4, the present invention seeks to attenuate the extreme pressures acting on the O-ring seal in order to increase the working life of the O-ring while maintaining a fuel tight seal past the plunger. In particular, FIG. 2 shows an injector body 11 that is substantially identical to that of the prior art in that it includes a fuel pressurization chamber 17 and an annular gap 18 where leakage could occur. In this embodiment, plunger 120 of the present invention includes an O-ring seal 24 that is substantially identical to that of the prior art. As a means for attenuating pressure on O-ring 24, a pressure accumulation volume 125, in the form of an annulus machined on plunger 120, is included. During the plunger's downward stroke, fuel pressure that would otherwise act upon O-ring 24 is attenuated by being accumulated within pressure accumulation volume 125. Those skilled in the art will appreciate that the larger pressure accumulation volume 125 is, the less pressure the O-ring will need to seal against in order to prevent leakage at annular gap 18. A smaller volume will naturally be able to accumulate less pressure during each cycle. Successive smaller volumes could be used in the place of a single larger volume. Pressure within the pressure accumulation volume 125 drops or resets itself for the next high pressure cycle when the plunger is retracting and fuel pressures are low.

FIG. 3 shows another embodiment of the present invention in which pressure on the O-ring is attenuated with a pair of pressure relief passages instead of the accumulation volume of the previous embodiment. In this embodiment, an injector body 111 includes a plunger bore 12 and a fuel pressurization chamber 17 substantially identical to that of the prior art embodiment shown in FIG. 1. However, unlike the embodiment in FIG. 1, injector body 111 includes a pair of pressure relief passages 119 that open into plunger bore 12 and a low pressure fuel return line (not shown). In this embodiment, plunger 20 and O-ring 24 are substantially identical to that of the plunger illustrated in FIG. 1. In this embodiment, pressure acting on O-ring 24 is attenuated by being released through pressure release passages 119 instead of being accumulated as in the previous embodiment. By proper sizing, FIG. 5 shows that the pressure attenuating means of FIGS. 2 and 3 can substantially reduce the pressure seen by the O-ring seal to less than half of that of the prior art. If the O-ring must seal against a lower pressure then its working life will naturally be extended accordingly.

FIG. 4 shows the preferred embodiment of the present invention which includes both a modified plunger to include a pressure accumulation volume and a modified injector body that includes a pressure release passage, combining the features of the two previous embodiments. In particular, injector body 211 includes a plunger bore 12 and a fuel pressurization chamber 17 substantially identical to the prior art and previous embodiments. However, a pressure release passage 219 has one end that opens into plunger bore 12 and its other end opening to a low pressure fuel return passage (not shown). The plunger 120 of this embodiment is substantially identical to that of FIG. 2 in that it includes an O-ring seal 24 and an annular pressure accumulation volume 125. It is important to note that pressure release passage 219 is positioned below O-ring 24, and pressure accumulation volume 25 is positioned between pressure release passage 219 and O-ring 24. This geometry also results in pressure accumulation volume necessarily being positioned between the pressure face end and the O-ring seal.

In this embodiment, pressure on the O-ring seal is attenuated by a combination of the accumulation volume and release strategies of FIGS. 2 and 3. In particular, as plunger 120 moves downward in its stroke, pressure on O-ring 24 is attenuated by a portion of the pressure leaking out of pressure release passage 219 while another portion of the pressure builds within pressure accumulation chamber 125. As plunger 120 continues its downward stroke, eventually pressure accumulation volume 125 opens to pressure release passage 219. At this time, pressure acting on O-ring 24 drops briefly because the pressure within pressure accumulation volume 25 drops to that of the low pressure return line connected to pressure release passage 219. This portion of the O-ring pressure trace is shown as a dip in the pressure as shown in FIG. 5. As plunger 120 continues its downward movement, pressure accumulation chamber 125 passes pressure release passage 219 and again begins to build up pressure. This is illustrated in FIG. 5 as a second peak in the O-ring pressure. Eventually, the injection event ends and plunger 120 begins to retract during the low pressure period of each injection cycle. By combining the pressure release and pressure accumulation concepts in FIG. 4, the pressure seen by the O-ring seal is further reduced over that of the embodiments shown in FIG. 2 and 3. Mathematical models predict that the peak O-ring pressure of the embodiment in FIG. 4 could be made to be less than one-third that of the O-ring pressure experienced by the prior art fuel injector of FIG. 1.

Although the fluid sealing strategy of the present invention was originally contemplated for use in regard to sealing against leakage along a plunger, the present invention finds potential application in other locations within a fuel injector. One of these potential applications is illustrated in FIG. 6 which shows the fluid sealing strategy of the present invention being applied to prevent leakage past the needle check valve of a fuel injector. In particular, a fuel injector 60 includes an injector body 61 made up of various components that are held together in a manner known in the art. The injector body defines a nozzle chamber 62 connected to a low pressure spring cage 64 via a bore 63. A cylindrically shaped needle check valve 71 is positioned to reciprocate within bore 63 between an opened position in which nozzle outlet 69 is open to nozzle chamber 62 and a closed position in which nozzle outlet 69 is closed. During each injection cycle, high pressure fuel acts upon hydraulic lift surfaces 73 of needle check 71 to move the same against the action of return spring 80 to its opened position. When pressure within nozzle chamber 62 drops sufficiently, needle check 71 closes under the action of return spring 80 in a manner known in the art.

Nozzle chamber 62 can be thought of as a cyclic high pressure space since it experiences an extremely high peak fuel pressure during each injection cycle but returns to a relatively low pressure between each injection event. See FIG. 1 and the accompanying text where a description of one possible example of how pressure within nozzle chamber 62 could cycle between a relatively low pressure and an extremely high pressure during each injection cycle. Pressure within spring cage 64 is normally maintained at relatively low pressure via an opening 65 that connects to low pressure fuel supply/return area 66. During injection events, the high pressure in nozzle chamber 62 tends to cause leakage in prior art devices between bore 63 and the side surface 71 of needle check 70. In this embodiment of the invention, leakage is prevented at location 67 due to the inclusion of a stationary O-ring 90 and an annular pressure accumulation volume 72 machined in the side surface 71 of needle check 70. O-ring 90 sees only a fraction of the pressure experienced within nozzle chamber 62 due to the fact that pressure on the O-ring is attenuated by being accumulated in accumulation volume 72 rather than acting directly upon the O-ring. Thus, this strategy allows spring cage 80 to be sealed against leakage along needle check 70 with an O-ring rated for pressures far lower than that encountered in nozzle chamber 62. In fact, accumulator chamber 72 can be made arbitrarily large in order to reduce the pressure on O-ring 90 to a very low level. The needle check could also utilize pressure release passages to further attenuate pressure on O-ring 90 by extending passageways between area 66 and bore 63 between O-ring 90 and nozzle chamber 62.

Industrial Applicability

Those skilled in the art will appreciate that the pressure attenuating concepts described above are intended to lower the pressure sealing demands on the O-ring in order to increase its working life while maintaining a superior seal to prevent against fuel leakage past the plunger, needle check or any other cylindrical member that experiences periodic extremely high pressures. The present invention will provide engineers with wide latitude in determining what pressure demands will be made on the O-ring seal by engineering a combination of clearances, lengths and desired sizes of pressure accumulation volumes. The device uses simple principles of compression to lower O-ring pressures. There appear to be no significant obstacles to choosing a large pressure accumulation volume in order to produce a relatively low pressure demand on the O-ring seal.

While the pressure accumulation volume means of attenuating pressure has been illustrated as annular grooves machined into the side of the plunger or needle check, those skilled in the art will appreciate that these volumes could also be machined into the wall of the bore. However, the former has been illustrated because the latter is believed to be far more difficult to manufacture in actual practice. Stacked volumes might also be desirable in the FIG. 4 embodiment to further reduce the peak pressure seen by the O-ring throughout the injection cycle.

While the pressure release passage means of attenuating pressure on the O-ring have been illustrated as one or more bores into the side of plunger bore 12, a plurality of pressure release passages could be included that could either be arranged in a horizontal plane as shown in FIG. 3 or stacked above one another to achieve any desired result. Those skilled in the art will also appreciate that any suitable O-ring material could be utilized with the present invention. What is important is that the pressure demands on the O-ring are attenuated by the features of the present invention in order to increase the working life of the O-ring while maintaining an adequate fluid seal. In any event, the above description should be viewed for illustrative purposes only and should not be viewed to limit the scope of the present invention, which is defined solely in terms of the claims as set forth below.

In order to interpret the claims in light of the disclosure set forth above, a cyclic high pressure space within an injector body can be a fuel pressurization chamber 17 as shown in FIGS. 1–4, a nozzle chamber 62 as shown in FIG. 6, an actuation fluid cavity in a hydraulically actuated fuel injector, or any other space within the injector that sees a high pressure at a high frequency. In an example not illustrated, the fluid sealing strategies of the present invention could be incorporated into a spool valve used to open and close the actuation fluid cavity of a hydraulically actuated fuel injector to high pressure actuation fluid, such as lubricating oil, or a low pressure drain. A cylindrical member could include plungers 20 and 120 of FIGS. 1–4, a needle check valve 70 as shown in FIG. 6, or even a spool valve member of the type utilized in hydraulically actuated fuel injectors of the type manufactured by Caterpillar Inc. In terms of periodically connecting the cyclic high pressure space to a source of high pressure fluid during each injection cycle, the embodiments of FIGS. 1–4 accomplish this simply by compressing fuel within fuel pressurization chamber 17 by the action of the plunger. In the case of the embodiment shown in FIG. 6, the cyclic high pressure space (nozzle chamber 62) is periodically supplied by extremely high pressure fuel in one of many ways known in the art, such as by connection to a fuel pressurization chamber via nozzle supply bore 68. In the case of a spool valve version of the present invention, which is not illustrated, the actuation fluid cavity would be open to a source of high pressure fluid whenever the valve opened the high pressure inlet. In each of these examples a cyclic high pressure space is opened to a low pressure zone during a different portion of each injection cycle. In the case of the embodiment shown in FIGS. 1–4, fuel pressurization chamber returns to a relatively low pressure when the plunger is retracting between injection events. In the case of the embodiment shown in FIG. 6, nozzle chamber 62 also returns to a relatively low pressure when the plunger is retracting. In the case of the spool valve, actuation fluid cavity returns to a relatively low pressure when the low pressure drain is opened by the spool valve member.

We claim:

1. A Fuel injector comprising:

an injector body with a plunger bore that opens to a nozzle outlet;

a plunger having a pressure face end and a side surface, and positioned to reciprocate in said plunger bore between an advanced position and a retracted position;

a portion of said plunger bore and said plunger defining a fuel pressurization chamber that opens to said nozzle outlet;

a needle valve member positioned in said injector body adjacent said nozzle outlet, and being movable between an open position in which said nozzle outlet is open and a closed position in which said nozzle outlet is closed to said fuel pressurization chamber;

an O-ring in contact with said side surface of said plunger and said plunger bore of said injector body; and a portion of said plunger and said plunger bore defining a pressure accumulation volume positioned between said O-ring and said pressure face end, and said pressure accumulation volume being positioned such that fluid pressure in said pressure accumulation volume changes with that of said fuel pressurization chamber.

2. The fuel injector of claim 1 wherein pressure accumulation volume includes an annulus defined by said side surface of said plunger.

3. The fuel injector of claim 1 wherein said injector body defines a pressure release passage that opens into said plunger bore below said O-ring and said pressure accumulation volume when said plunger is in said retracted position; and said pressure accumulation volume opening to said pressure release passage over a portion of said plunger's movement between said retracted position and said advanced position, and said pressure accumulation volume being closed to said pressure release passage over a different portion of said plunger's movement between said retracted position and said advanced position.

4. The fuel injector of claim 1 wherein said fuel pressurization chamber experiences a peak fuel pressure when said plunger is moving toward said advanced position;

said O-ring experiences a peak sealing pressure when said plunger is moving toward said advanced position; and said pressure accumulation volume is sufficiently large that said peak fuel pressure is substantially higher than said peak sealing pressure.

5. The fuel injector of claim 2 wherein said fuel pressurization chamber experiences a peak fuel pressure when said plunger is moving toward said advanced position;

said O-ring experiences a peak sealing pressure when said plunger is moving toward said advanced position; and said pressure accumulation volume is sufficiently large that said peak fuel pressure is substantially higher than said peak sealing pressure.

6. The fuel injector of claim 5 wherein said injector body defines a pressure release passage that opens into said plunger bore below said O-ring and said pressure accumulation volume when said plunger is in said retracted position; and said pressure accumulation volume opening to said pressure release passage over a portion of said plunger's movement between said retracted position and said advanced position, and said pressure accumulation volume being closed to said pressure release passage over a different portion of said plunger's movement between said retracted position and said advanced position.

7. A cyclic high pressure fluid seal for a fuel injector, comprising:

an injector body defining a cyclic high pressure space connected to a low pressure space by a bore;

a member with a pressure face end and a side surface mounted to reciprocate in said bore between a retracted position and an advanced position;

an O-ring in contact with said side surface of said member and said injector body within said bore;

a portion of said member and said bore defining a pressure accumulation volume positioned between said O-ring and said pressure face end, and said pressure accumulation volume being positioned such that fluid pressure in said pressure accumulation volume changes with that of said cyclic high pressure space.

8. The fluid seal of claim 7 wherein pressure accumulation volume includes an annulus defined by said side surface of said member.

9. The fluid seal of claim 7 wherein said injector body defines a pressure release passage that opens into said bore below said O-ring and said pressure accumulation volume when said member is in said retracted position; and said pressure accumulation volume opening to said pressure release passage over a portion of said member's movement between said retracted position and said advanced position.

10. The fluid seal of claim 9 wherein said pressure accumulation volume is closed to said pressure release passage over a different portion of said plunger's movement between said retracted position and said advanced position.

11. The fluid seal of claim 7 wherein said cyclic high pressure space experiences a peak fuel pressure;

said O-ring experiences a peak sealing pressure; and said pressure accumulation volume is sufficiently large that said peak fuel pressure is substantially higher than said peak sealing pressure.

12. The fluid seal of claim 7 wherein said injector body defines a pressure release passage that opens into said bore below said O-ring and said pressure accumulation volume when said member is in said retracted position; and said pressure accumulation volume opening to said pressure release passage over a portion of said plunger's movement between said retracted position and said advanced position, and said pressure accumulation volume being closed to said pressure release passage over a different portion of said plunger's movement between said retracted position and said advanced position.

13. The fluid seal of claim 7 wherein said member is a plunger;

said bore is a plunger bore; and said cyclic high pressure space is a fuel pressurization chamber.

14. The fluid seal of claim 7 wherein said member is a needle valve member; and said cyclic high pressure space is a nozzle chamber.

* * * * *